J. C. WRENSHALL.
PROCESS OF AND APPARATUS FOR PRESERVING FRUITS, VEGETABLES, &c.

No. 104,680. Patented June 21, 1870.

John C. Wrenshall
by his attorney
A. Pollok

WITNESSES.

United States Patent Office.

JOHN C. WRENSHALL, OF BALTIMORE, MARYLAND.

Letters Patent No. 104,680, dated June 21, 1870.

IMPROVEMENT IN PROCESS AND APPARATUS FOR PRESERVING FRUITS, VEGETABLES, &c.

The Schedule referred to in these Letters Patent and making part of the same

*To whom it may concern:*

Be it known that I, JOHN C. WRENSHALL, of the city and county of Baltimore and State of Maryland, have invented a certain new and improved Mode of and Apparatus for Preserving Fruits, Vegetables, Liquors, and Meats, of which the following is a specification.

My invention is based upon the principle of preserving fruits, meats, and other animal and vegetable substances, by closing the jars, or other vessels in which such substances are contained, while the same are in a vacuum; and The invention consists—

First, in the mode of partially or wholly cooking the fruit or other substance to be preserved, by placing the said substance in a vacuum, and then admitting steam, so as to partly, but not wholly, reduce the vacuum, and then, while the vacuum is still maintained, corking or sealing the jar or other vessel in which the substance is contained.

Second, in a mode of preparing fruit for "preserves" or "conserves," by placing the fruit in jars and covering it with properly-prepared sirup, either hot or cold; then placing it in a vacuum-chamber, and extracting the air to a high degree; then admitting air, so as to destroy the vacuum and drive the sirup into the fruit; then creating a second vacuum sufficient to allow the jars or vessels to be sealed or corked while the air is excluded.

Third, in an apparatus for corking jars and other vessels or receptacles for the animal or vegetable substances to be preserved, provided with a sliding follower, arranged within the vacuum-chamber, and actuated by a treadle or other mechanism from the exterior of the chamber, so as to force the cork in the jar or other vessel to be sealed.

Fourth, in other features relating to the organization and construction of the apparatus to be hereinafter described.

The nature of my invention, and the manner in which the same is or may be carried into effect, will be fully understood by reference to the accompanying drawing, in which—

In order that I may describe more readily the manner in which I effect the corking of the jars, the partial cooking of the fruit or other substance, and the preparation of fruit, so that it may be used as a "conserve," I will first describe the construction of the apparatus in which these various processes may be carried out.

It consists of a cylinder, A, of cast-iron or other material, which is intended to be the vacuum-chamber.

The cylinder is arranged vertically over a table or frame, B, and is provided with two ears, $a$, on each side, which fit on the guide and supporting rods C, so that the cylinder may be moved up or down toward or away from the table.

In order to render the movement of the cylinder easy, I attach a rope to its top, which runs over pulleys $c$, and has attached to its opposite end a counterweight, $d$.

An air-cock, $e$, is placed on the cylinder, through which air can pass whenever required.

The cylinder may be otherwise counterpoised, and it may be held and run in "ways" of different construction, but the arrangement herein described is simple and well adapted for the purpose.

Figure 1:
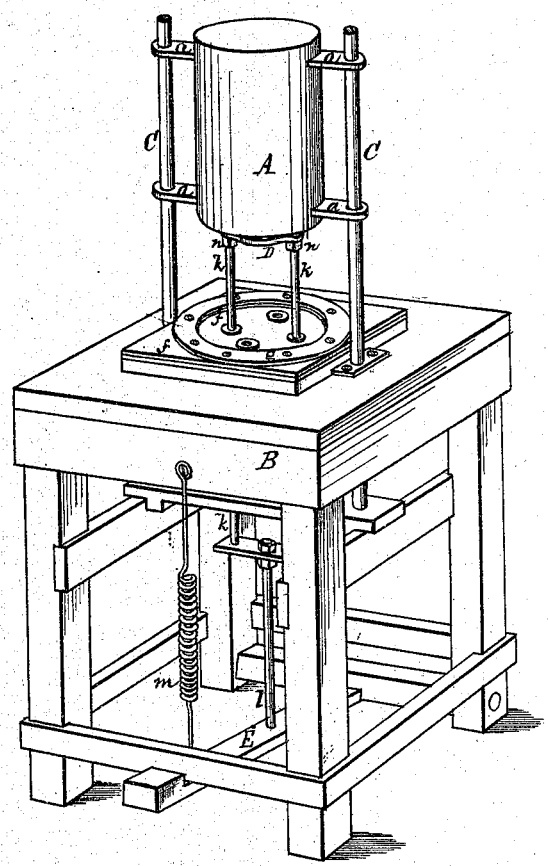
Figure 1 is a perspective view of an apparatus adapted to carry out my invention.
Figure 2:
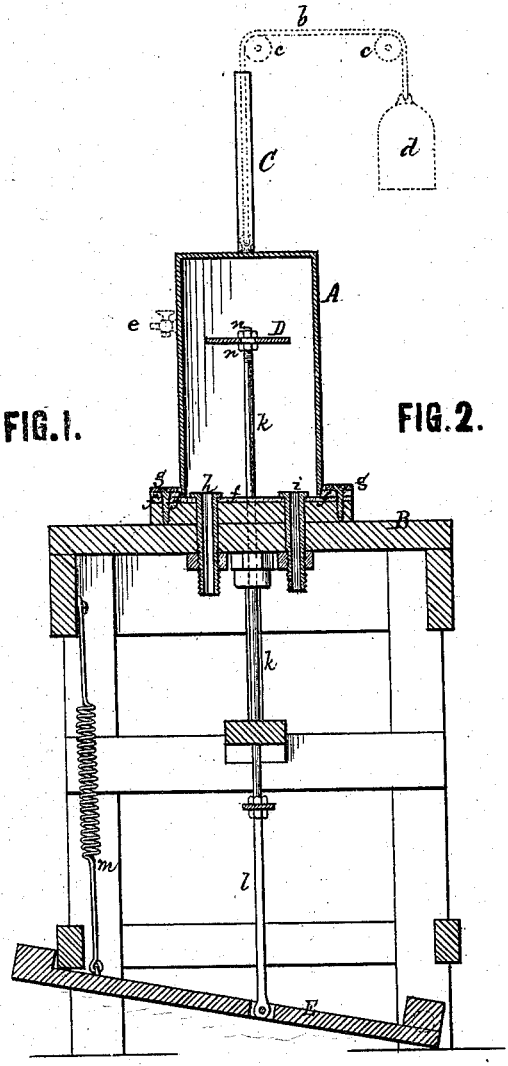
Figure 2 is a vertical central section of the same from the front to the rear of the machine.

The cylinder, when lowered as shown in fig. 2, rests on a packing plate of rubber, $f$, or other suitable material recessed or grooved to receive the lower end of the cylinder, so as to form a perfectly tight joint.

The packing is secured to the table by means of a metallic ring, $g$, or by other suitable means.

Extending up through the table, and so located as to open into the vacuum-chamber, are two orifices, $h$ $i$, the former communicating with the air-exhaust or vacuum apparatus, the latter with any suitable steam-supply.

The cocks for opening and closing the steam and vacuum-pipes I prefer to arrange on the front of the machine, and within easy reach of the workman, and as their arrangement will be readily understood, I have not deemed it necessary to represent them in the drawing.

Within the vacuum-chamber, and over that part of the table or the bottom of the vacuum-chamber on which the jar or other receptacle to be corked is placed, is a sliding follower or head, D, which is supported by two rods, $k$, passing down through suitably-stuffed or packed boxes in the table, and connected at their lower ends with a rod, $l$, hinged to a treadle, E. By depressing this treadle with the foot, the workman forces down the follower or head, brings it in contact with the cork placed over the mouth of the jar, and forces it home. When the foot is removed from the treadle, a spring, $m$, throws it up, and consequently raises again the follower.

The follower or head D is made adjustable upon the rods $k$ by means of holding nuts $n$ $n$ above and below it, so that it can be moved up or down upon the rods to conform to the height of the jar or vessel to be corked. The same result may be arrived at by means of auxiliary plates, which can be added to or taken from the under side of the follower according to the height of the jar.

In case a bottle or other vessel with a small mouth is to be corked, I prefer to provide the under side of the follower with a small pin or spike, upon which the cork is held during the descent of the follower, and until it has been firmly driven into the bottle. But in corking wide-mouthed vessels, such as jars, the cork may be allowed to rest over and upon the mouth of the jar, so as to be in the path of the descending follower.

In using this apparatus, and when it is only desired to cork the jars in a vacuum without any preliminary treatment of the fruit or other substance contained in the jar, the workman takes his stand in front of the machine, throws up the cylinder, places the jar on the bottom *f* under the follower, and places over its mouth the cork with which it is to be closed; he then draws down the cylinder, opens the vacuum-cock, so as to allow the air to be exhausted; and when the gauge, with which the apparatus should be provided, indicates the required degree of vacuum, he closes the vacuum-cock, and placing his foot upon the treadle, forces down the follower, which drives the cork into the bottle. He next opens the air-cock *e*, so as to destroy the vacuum, throws up the cylinder, and takes out the corked jar and dips its neck, or the end where the cork is, into a pan of melted wax or sealing composition, so as to at once close every aperture for the admission of air. This completes the operation.

As the cork rests lightly over the mouth of the jar, it does not prevent, in the slightest degree, the exhaustion of the air from the interior of the jar.

The apparatus is also adapted to the corking of bottles filled with wine or other liquids from which it is desirable to exclude air.

In order to partially cook the fruit or other substance to be preserved, the jar or vessel containing the same is placed within the cylinder, and the vacuum is created as before. Instead, however, of immediately corking the jar, I exhaust the air until the gauge indicates a vacuum of, say, from ten to twelve pounds, and then, closing the vacuum-cock, I open the steam-cock, and admit steam through the pipe *i* until the gauge has fallen to indicate a vacuum of, say, from three to four pounds, the steam thus admitted being sufficient to almost instantaneously penetrate the fruit and partially cook it. Steam is then shut off; and, while the fruit is still in vacuum, the workman depresses the treadle and forces the cock in the jar, which is thus corked in a vacuum of from three to four pounds, and the after condensation of the steam in the jar, when the latter is removed from the apparatus, will tend to render more perfect the vacuum within the jar. By this simple process, I am enabled to partially cook the fruit or other substance to be preserved while in vacuum.

In order to make fruit into "preserves," or to fit it to be used for "conserves," I place the fruit in jars, and cover it with properly-prepared sirup, either heated or cold. I then place it in the vacuum-chamber, exhaust the air to a high degree, and then open the air-cock *e*, so as to admit air, restoring the atmospheric pressure, which serves to drive the sirup into the fruit. I then close the air-cock and again exhaust the air in the chamber, so as to create a second vacuum in which the jars are corked, as above described. The remainder of the process is similar to that which has already been stated, and does not require repetition.

By this means the sirup is intimately mingled with the fruit, and in both this process and the steaming process before described, the flavor of the fruit or other substance operated on is perfectly preserved. Fruit thus impregnated with sirup, can, when required, be taken out of the can or jar and dried or coated with sugar, so as to make an excellent conserve.

Having now described my invention, and the manner in which the same is or may be carried into effect, I would state, in conclusion, that I do not limit myself to the precise details herein described, as the same may be varied without departure from the principle of my invention; but

What I claim, and desire to secure by Letters Patent, is—

1. The process herein described of preserving fruit, or other vegetable or animal substances, by treating the same with steam in a vacuum and corking or sealing the jar or vessel in which said substance is contained while the vacuum is maintained, substantially as set forth.

2. The preparation of fruit for "conserves," substantially in the manner herein set forth.

3. The use, within the vacuum-chamber, of an apparatus for preserving animal and vegetable substances, of a follower or sliding head for corking the can or other vessel placed within the vacuum-chamber, actuated from the exterior of the said chamber by means of a treadle and connecting-rods, or the equivalent of the same, substantially in the manner and for the purposes described.

4. The follower or head for corking the jar or other vessel, when made adjustable, or otherwise constructed, as herein described, so as to conform to the height of the jar or vessel placed within the vacuum-chamber.

5. The combination of the sliding and counterpoised cylinder with the table or frame, and the packing upon said table for making a tight joint with the lower end of the cylinder, when the latter rests upon the table and is in communication with the air-exhaust, substantially as shown and set forth.

6. An apparatus for preserving animal and vegetable substances, organized and operating substantially as herein shown and described.

In testimony whereof I have signed my name to this specification before two subscribing witnesses.

J. C. WRENSHALL.

Witnesses:
 EDM. F. BROWN,
 WM. H. MCCABE.